(12) United States Patent
Hahn

(10) Patent No.: US 8,028,815 B2
(45) Date of Patent: Oct. 4, 2011

(54) CONVEYING DEVICE

(75) Inventor: Wolfgang Hahn, Donaustauf (DE)

(73) Assignee: Krones AG, Neutraubling (DE)

( * ) Notice: Subject to any disclaimer, the term of this patent is extended or adjusted under 35 U.S.C. 154(b) by 41 days.

(21) Appl. No.: 12/374,357

(22) PCT Filed: Jul. 2, 2007

(86) PCT No.: PCT/EP2007/005824
§ 371 (c)(1),
(2), (4) Date: Oct. 12, 2009

(87) PCT Pub. No.: WO2008/014857
PCT Pub. Date: Feb. 7, 2008

(65) Prior Publication Data
US 2010/0044185 A1    Feb. 25, 2010

(30) Foreign Application Priority Data
Jul. 29, 2006    (DE) .......................... 10 2006 035 109

(51) Int. Cl.
*B65G 1/00*    (2006.01)
(52) U.S. Cl. ................. 198/347.1; 198/459.2
(58) Field of Classification Search ............... 198/347.1, 198/459.2
See application file for complete search history.

(56) References Cited

U.S. PATENT DOCUMENTS

| | | |
|---|---|---|
| 1,810,419 A | 6/1931 | Francis |
| 2,788,140 A | 4/1957 | Becker |
| 3,297,138 A | 1/1967 | McCombie |
| 3,575,282 A | 4/1971 | Gaiotto et al. |
| 3,664,487 A | 5/1972 | Ballenger |
| 3,968,861 A | 7/1976 | Kernen et al. |
| 4,018,325 A | 4/1977 | Rejsa |
| 4,153,858 A | 5/1979 | Schylander et al. |
| 4,269,299 A | 5/1981 | Goodman |
| 4,294,345 A | 10/1981 | Stauber et al. |
| 4,399,909 A | 8/1983 | Gorelik |
| 4,413,724 A | 11/1983 | Fellner |
| 4,468,277 A | 8/1984 | Kontz |
| 4,469,219 A | 9/1984 | Cosse et al. |
| 4,513,858 A | 4/1985 | Fellner et al. |

(Continued)

FOREIGN PATENT DOCUMENTS

CA    2364216    6/2003

(Continued)

OTHER PUBLICATIONS

Dynac Model 6400 Series General Specification Brochure, 2002, Hartness International, Greenville, SC, US (2 pp.).

(Continued)

*Primary Examiner* — James R Bidwell
(74) *Attorney, Agent, or Firm* — Marshall, Gerstein & Borun LLP

(57) ABSTRACT

A conveying device for objects, in particular for bottles, having a first conveyor, a second conveyor and an intermediate buffer communicating with said first and second conveyors via a first transfer site. In order to increase the flexibility of such a conveying device, the first and second conveyors are connected to the buffer separately from one another via a respective first transfer site. Also, a switchable intermediate conveyor is provided, which bypasses the buffer and which is in conveying connection with the first and second conveyors via a respective second transfer site.

11 Claims, 2 Drawing Sheets

U.S. PATENT DOCUMENTS

| | | | |
|---|---|---|---|
| 4,549,647 A | 10/1985 | Crosse | |
| 4,565,284 A | 1/1986 | Seragnoli et al. | |
| 4,838,410 A | 6/1989 | Gough | |
| 4,903,823 A | 2/1990 | Plesser et al. | |
| 4,989,718 A | 2/1991 | Steeber | |
| 5,022,609 A | 6/1991 | Cranston | |
| 5,076,422 A | 12/1991 | Clopton | |
| 5,129,506 A | 7/1992 | Gutov et al. | |
| 5,191,959 A | 3/1993 | Leemkuil | |
| 5,413,213 A | 5/1995 | Golz et al. | |
| 5,429,227 A | 7/1995 | Krossmann et al. | |
| 5,490,589 A | 2/1996 | Golz et al. | |
| 5,620,084 A | 4/1997 | Mensch | |
| 5,645,159 A | 7/1997 | Luginbuhl et al. | |
| 5,722,655 A | 3/1998 | Reist et al. | |
| 5,772,005 A | 6/1998 | Hansch et al. | |
| 5,863,571 A | 1/1999 | Santais et al. | |
| 5,996,322 A * | 12/1999 | La Barre | 198/347.1 |
| 6,079,541 A | 6/2000 | Bercelli et al. | |
| 6,119,848 A | 9/2000 | Hartness, III et al. | |
| 6,152,291 A | 11/2000 | Steeber et al. | |
| 6,168,004 B1 | 1/2001 | Drewitz et al. | |
| 6,182,812 B1 | 2/2001 | Hartness, III et al. | |
| 6,209,716 B1 | 4/2001 | Bogle et al. | |
| 6,230,874 B1 | 5/2001 | Steeber et al. | |
| 6,241,074 B1 | 6/2001 | Steeber | |
| 6,260,688 B1 | 7/2001 | Steeber et al. | |
| 6,334,528 B1 | 1/2002 | Bogle et al. | |
| 6,354,427 B1 | 3/2002 | Pickel et al. | |
| 6,382,398 B2 | 5/2002 | Steeber et al. | |
| 6,394,260 B1 | 5/2002 | Barth et al. | |
| 6,446,781 B1 | 9/2002 | De Villele et al. | |
| 6,497,321 B2 | 12/2002 | Horton et al. | |
| 6,520,318 B1 | 2/2003 | Humele | |
| 6,523,669 B1 | 2/2003 | Steeber et al. | |
| 6,533,103 B2 | 3/2003 | Hartness et al. | |
| 6,550,602 B2 | 4/2003 | Steeber et al. | |
| 6,585,104 B2 | 7/2003 | Horton et al. | |
| 6,591,963 B2 | 7/2003 | Wipf | |
| 6,601,697 B2 | 8/2003 | Steeber et al. | |
| 6,612,420 B1 | 9/2003 | Hartness, III et al. | |
| 6,662,936 B2 | 12/2003 | Ikemoto et al. | |
| 6,698,581 B2 | 3/2004 | Steeber et al. | |
| 6,725,997 B2 | 4/2004 | Draghetti | |
| 6,725,998 B2 | 4/2004 | Steeber et al. | |
| 6,761,264 B2 | 7/2004 | Steeber et al. | |
| 6,779,651 B1 | 8/2004 | Linglet et al. | |
| 6,817,464 B2 | 11/2004 | Biondi et al. | |
| 6,846,145 B2 | 1/2005 | Remericq | |
| 6,848,563 B2 | 2/2005 | Abert et al. | |
| 6,896,120 B2 | 5/2005 | Barry et al. | |
| 6,959,953 B2 | 11/2005 | Graffin | |
| 6,973,767 B2 | 12/2005 | Wagner et al. | |
| 7,021,452 B2 | 4/2006 | Horton et al. | |
| 7,032,742 B2 | 4/2006 | Hartness et al. | |
| 7,140,870 B2 | 11/2006 | Nava | |
| 7,191,896 B2 | 3/2007 | Hartness et al. | |
| 7,219,788 B2 | 5/2007 | Tuck et al. | |
| 7,264,113 B2 | 9/2007 | Hartness et al. | |
| 7,278,531 B2 | 10/2007 | Hartness et al. | |
| 7,299,832 B2 | 11/2007 | Hartness et al. | |
| 7,311,515 B2 | 12/2007 | Netsu et al. | |
| 7,331,156 B2 | 2/2008 | Hartness et al. | |
| 7,334,677 B2 | 2/2008 | Mader et al. | |
| 7,413,072 B2 | 8/2008 | Horton et al. | |
| 7,431,142 B2 | 10/2008 | Eberle | |
| 7,442,031 B2 | 10/2008 | Netsu | |
| 2002/0053499 A1 | 5/2002 | Zurcher | |
| 2002/0144880 A1 | 10/2002 | Ikemoto et al. | |
| 2002/0195317 A1 | 12/2002 | Wipf | |
| 2003/0085103 A1 | 5/2003 | Horton et al. | |
| 2003/0155212 A1 | 8/2003 | Abert et al. | |
| 2007/0235288 A1 | 10/2007 | Horton et al. | |
| 2008/0142336 A1 | 6/2008 | Kronseder et al. | |
| 2008/0210520 A1 | 9/2008 | Legallais | |
| 2008/0223691 A1 | 9/2008 | Nishi et al. | |

FOREIGN PATENT DOCUMENTS

| | | |
|---|---|---|
| DE | 1080580 | 4/1960 |
| DE | 2610833 | 9/1977 |
| DE | 2618905 | 11/1977 |
| DE | 19824846 | 12/1999 |
| DE | 19928325 | 12/2000 |
| DE | 29913237 | 12/2000 |
| DE | 102004053663 | 8/2005 |
| DE | 202006003690 | 6/2006 |
| DE | 1020060120148 | 9/2007 |
| EP | 0506551 | 9/1992 |
| EP | 0581143 | 2/1994 |
| EP | 0734978 | 10/1996 |
| EP | 1161391 | 12/2001 |
| EP | 1275603 | 1/2003 |
| EP | 1295820 | 3/2003 |
| EP | 1389595 | 2/2004 |
| EP | 1832533 | 9/2007 |
| FR | 2745804 | 9/1997 |
| FR | 2766803 | 2/1999 |
| GB | 1301843 | 1/1973 |
| GB | 2047667 | 12/1980 |
| GB | 2143788 | 2/1985 |
| GB | 2300613 | 11/1996 |
| JP | 61197376 | 9/1986 |
| JP | 7046977 | 2/1995 |
| RU | 2160694 | 12/2000 |
| RU | 2198835 | 2/2003 |
| WO | WO-9709257 | 3/1997 |
| WO | WO-0043294 | 7/2000 |
| WO | WO-01/10754 | 2/2001 |
| WO | WO-0198187 | 12/2001 |
| WO | WO-02/072454 | 9/2002 |
| WO | WO-2005/073113 | 8/2005 |
| WO | WO-2007/025598 | 3/2007 |

OTHER PUBLICATIONS

Dynac 6000 Series Brochure, Hartness International, Greenville, SC, US (2 pp.).

Dynac Model 7000 Brochure, Hartness International, Greenville, SC, US (2 pp.).

Dynac 7000 Series General Specification Brochure 2002, Hartness International, Greenville, SC, US (2 pp.).

Anonymous, "Paternoster", 7 pp., Retrieved from the Internet on Apr. 28, 2008: http://en.wikipedia.org/wiki/Paternoster.

Anonymous, "Paternoster lift, also known as the cyclic elevator", 3 pp., Retrieved from the Internet on Apr. 18, 2008: http:www.dartfordarchive.org/uk/technology/magnified/cyclic_elev.htm.

International Search Report and Written Opinion for International Application No. PCT/EP2007/005824, (Oct. 8, 2007).

International Preliminary Report on Patentability for International Application No. PCT/EP2007/005824, dated Feb. 17, 2009.

International Search Report and Written Opinion for International Application No. PCT/EP2005/010747 (Nov. 21, 2005).

International Preliminary Report on Patentability for International Application No. PCT/EP2005/010747 (Apr. 24, 2007).

International Search Report and Written Opinion for International Application No. PCT/EP2007/000485 (May 7, 2007).

International Preliminary Report on Patentability for International Application No. PCT/EP2007/000485 (Nov. 4, 2008).

International Search Report and Written Opinion for International Application No. PCT/EP2006/0006648 (Sep. 25, 2006).

International Preliminary Report on Patentability for International Application No. PCT/EP2006/0006648 (Apr. 15, 2008).

International Search Report and Written Opinion for International Application No. PCT/EP2005/000942 (Sep. 30, 2005).

International Preliminary Report on Patentability for International Application No. PCT/EP2005/000942 (Oct. 3, 2006).

Non-final Office Action for U.S. Appl. No. 11/663,097 (Apr. 13, 2009).

Non-final Office Action for U.S. Appl. No. 10/588,046 (Nov. 21, 2008).
Final Office Action for U.S. Appl. No. 10/588,046 (Jun. 8, 2009).
International Search Report and Written Opinion for International Application No. PCT/EP2007/000305 (Apr. 19, 2007).

International Preliminary Report on Patentability for International Application No. PCT/EP2007/000305 (Oct. 14, 2008).

* cited by examiner

CONVEYING DEVICE

The present application claims the benefit of priority of International Patent Application No. PCT/EP2007/005824, filed Jul. 2, 2007 which application claims priority of German Patent Application No. 10 2006 035 109.6, filed Jul. 29, 2006. The entire text of the priority application is incorporated herein by reference in its entirety.

FIELD OF THE DISCLOSURE

The disclosure relates to a conveying device for objects, in particular bottles, such as in beverage bottling operations.

BACKGROUND

Such a conveying device is known from DE 198 24 846. The known conveying device is arranged between a blow-molding machine used for producing plastic bottles and a filling machine for filling these bottles. The conveying device comprises a buffer for temporarily storing bottles as well as a large number of star wheels. In particular, a transfer star wheel is provided, which is used for charging and discharging the buffer as well as for directly conveying the bottles between the two machines without making use of the buffer. The transfer star wheel communicates through respective transfer sites with the outfeed conveyor of the blow-molding machine and with the infeed conveyor of the filling machine. The transfer star wheel additionally communicates via a third transfer site with the buffer (through a charging and discharging star wheel). This charging and discharging star wheel is switched inoperative when direct conveying between the machines is possible. However, this structural design operates with a comparatively low flexibility and it only works when the conveying speeds are identical on both sides of the transfer star wheel.

According to a further embodiment, the charging and discharging star wheel is replaced by a conveyor unit which can be pivoted after the fashion of a track switch. When occupying a first position, the conveyor unit connects the transfer star wheel to the buffer and, when occupying a second position, the conveyor unit connects the transfer star wheel to the infeed point of a downstream machine so as to effect direct conveying. Also this embodiment needs identical speeds. In addition, the emptying of the buffer necessitates an inversion of the conveying direction, which is comparatively difficult to control.

A conveying device making use of a deflection into a buffer after the fashion of a track switch is known e.g. also from U.S. Pat. No. 6,152,291. The conveying device comprises a linear conveyor in the form of a conveyor belt communicating via a respective kind of track switch with an infeed conveyor and with an outfeed conveyor of a dynamic buffer. Whereas the infeed and outfeed conveyors of the buffer can operate at different speeds, the speed at which the linear conveyor can supply the articles to the first track switch and transport the articles away from the second track switch is determined by the direct connection through the continuous conveyor belt.

SUMMARY OF THE DISCLOSURE

It is the object of the present disclosure to provide a conveying device which can be adapted more flexibly to the various conveying states.

The structural design according to the present disclosure provides a conveying device which interconnects the first and the second conveyor in such a way that the two conveyors can operate at different speeds, e.g. for emptying the buffer. A synchronous operation of the two conveyors is nevertheless possible as well. It follows that the conveying device according to the present disclosure offers an increased degree of flexibility which can be utilized e.g. for increasing the conveying speed and the throughput. An additional advantage is that production losses will be reduced by a faster regeneration of the buffer and by an earlier activation of the upstream machine.

The buffer used is preferably a dynamic buffer, i.e. a buffer which has a variable buffer capacity and which offers the possibility of realizing different infeed and outfeed speeds in the case of simultaneously infeed and outfeed operations, said dynamic buffer guaranteeing nevertheless that the object which enters the buffer first will also be removed therefrom first (first in-first out). However, conveyors of any kind can be used, especially when they allow the first conveyor to be decoupled from the second conveyor as regards the conveying speed.

The intermediate conveyor and/or the first and the second conveyor are preferably implemented as star wheels, since this allows a particularly simple structural solution of the conveying tasks according to the present disclosure.

The intermediate conveyor is switchable, i.e. it can back out of its conveying task or resume its conveying task according to requirements. This is preferably achieved in that the object take-up means are rendered ineffective at the transfer sites, e.g. by retracing the take-up means from their take-up position. Take-up means that can be switched ineffective, if necessary, are known from the prior art.

The conveying device according to the present disclosure can be used in a particularly advantageous manner in a bottle handling apparatus. The plastic bottle handling plants which are nowadays normally used and which comprise operations for producing, filling, closing, labelling and packing such plastic bottles, e.g. PET bottles, must be configured for high throughputs and the operating efficiency of such plants increases in proportion to an increase in their operating speed and a decrease in their susceptibility to failure. The conveying device according to the present disclosure offers the possibility of flexibly reacting e.g. to possible failures and of keeping the production losses caused by such failures as small as possible.

In addition to the mere buffer function, which is also given in the prior art, the conveying device according to the present disclosure allows a flexible use of the buffer, since both conveyors are connected to the buffer through a transfer site of their own, whereas the intermediate conveyor is fully removed from the conveying line when the buffer is in operation and resumes its conveying tasks only if the buffer is bridged during direct conveying. When the buffer is bridged, it can, however, be disabled whereby the amount of wear will be reduced to a significant extent.

The damage occurring in a bottle handling plant will be most severe when the blow-molding machine operates correctly, whereas some other device, downstream of the blow-molding machine, stands still. In order to prevent in this case that the preforms, which are contained in the blow-molding machine at the moment in question, can no longer be processed into finished bottles and have to be rejected consequently, the conveying device according to the present disclosure can advantageously be arranged between the blow-molding machine and an arbitrary one of the downstream machines, e.g. a filler, so that the blow-molding machine can finish the currently produced preforms and store them temporarily in the buffer. When the failure has been eliminated, the blow-molding machine can resume its operation, while the buffer is still being emptied, so that the downtime of the blow-molding machine will be reduced and so that the efficiency of the plant will be increased. If the buffer should be emptied more rapidly than it is being refilled, the intermediate conveyor can be switched on again at some time or other and the buffer can be deactivated, whereby its wear will be reduced.

BRIEF DESCRIPTION OF THE DRAWINGS

In the following, embodiments of the present disclosure will be explained in detail making reference to the drawings, in which.

DETAILED DESCRIPTION OF THE PREFERRED EMBODIMENT

Figure 1:
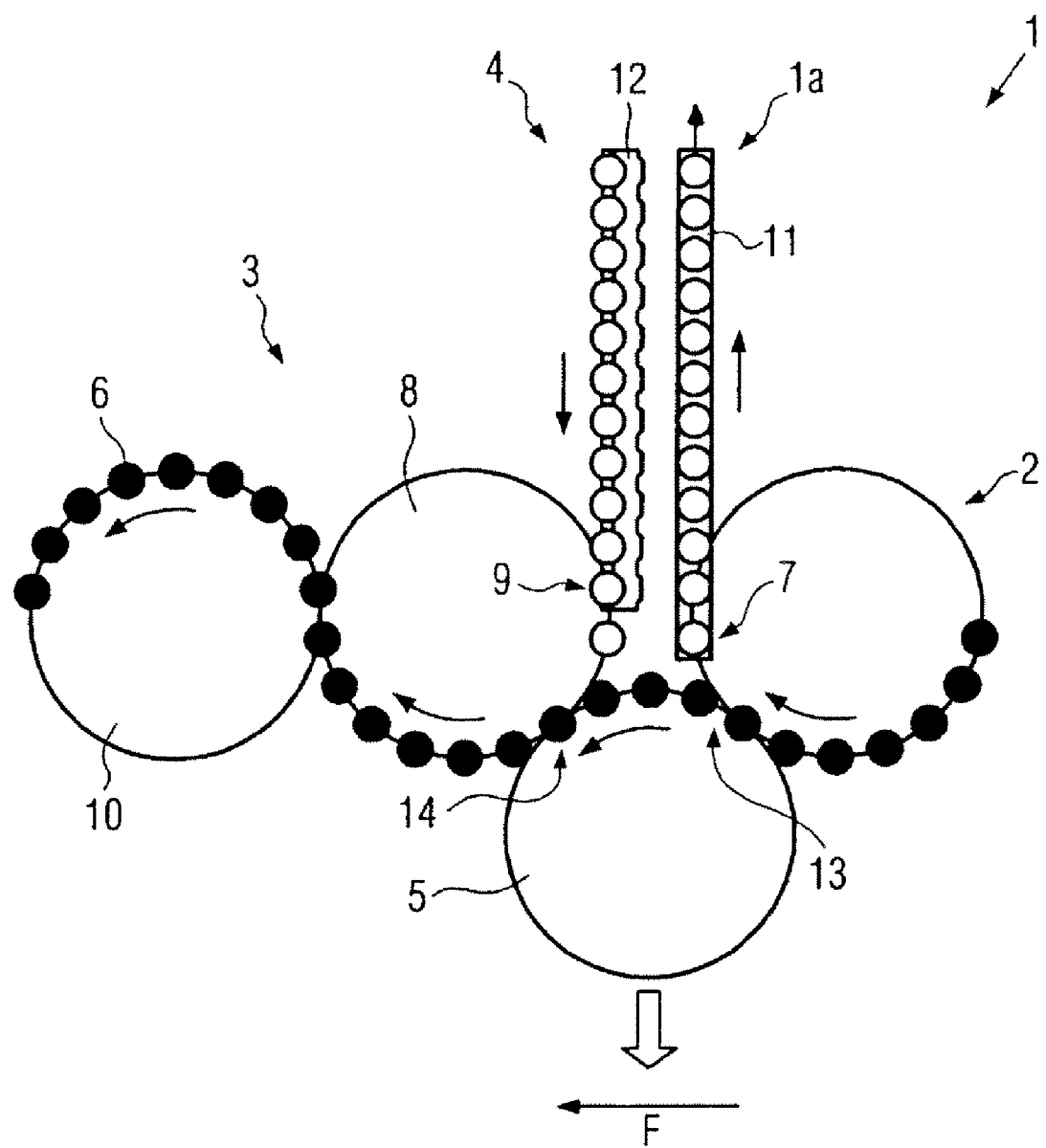
FIG. 1 shows a schematic representation of the function of a first embodiment of a conveying device according to the present disclosure.

FIG. 1 shows in a highly schematic representation a first embodiment 1a of a conveying device 1 according to the present disclosure. The conveying device 1 comprises a first conveyor 2, a second conveyor 3, a buffer 4 and an intermediate conveyor 5, all of them configured for conveying objects 6, e.g. bottles and in particular PET bottles, which are passed through the conveying device 1 in a predetermined conveying direction F.

In the embodiment shown, the first conveyor 2 is configured as one of the conventional star wheels or rotors of the type used e.g. in handling plants for (plastic) bottles, in particular PET bottles, which convey the bottles in a condition in which they are suspended by the neck (neck handling). The first conveyor 2 is here shown only as a single conveyor, but, depending on the structural design of the plant, the first conveyor 2 may comprise a plurality of star wheels or rotors or other conveyors or it may be implemented directly as an outfeed means of a bottle handling machine. In the embodiment shown, the first conveyor 2 comprises a discharge star wheel connecting an upstream machine, e.g. a blow molding machine for producing (PET) plastic bottles, to the buffer 4 via a first transfer site 7 where objects 6 can be transferred from the first conveyor 2 to said buffer 4. The structural design of such transfer sites is known in the prior art.

Also the second conveyor 3 comprises, in the embodiment shown, a star wheel 8 communicating with the buffer 4 via a first transfer site 9. In the embodiment shown, the first star wheel 8 is an indexing star wheel which is able to increase or reduce the distances between successively conveyed objects 6. The second conveyor 3 additionally comprises a second star wheel 10 following the first star wheel 8 and acting as an infeed star wheel for a downstream machine, e.g. a bottle filler. Also the second conveyor can have an arbitrary structural design, depending on the given circumstances. For example, the indexing star wheel can be dispensed with and the infeed star wheel of the downstream machine can be connected to the buffer 4 directly via the first transfer site 9.

The buffer 4 can be a conveying loop in the simplest case; it should, however, have an accumulating capability, i.e. it should be able to reduce the distance between the objects to zero so that the second conveyor 3 can (while reestablishing distances between neighboring objects 6) remove the objects 6 from the buffer 4 at a speed which is higher than the conveying speed of the buffer 4 and/or the speed of the first conveyor 2.

In the embodiment shown, the buffer 4 comprises a simple conveyor belt 11, onto which the first conveyor 2 deposits the objects 6, e.g. the bottles, at the transfer site 7 (upright conveying mode), and which is operated such that the distances between the objects 6 are eliminated.

The buffer 4 additionally comprises a conventional screw conveyor 12 which takes up the objects 6 and feeds them in a defined manner to the first transfer site 9 to the second conveyor 3 where a distance between the objects is already established; this distance is sufficiently large for allowing the objects 6 to be seized and transported away by the second conveyor 3. Said distance is then adjusted to a correct value by the indexing star wheel 8 before the objects are transferred to the infeed star wheel 10.

Also the intermediate conveyor 5 is configured as a star wheel, preferably as a star wheel of the same type as those of the first and second conveyors 2, 3. If the objects 6 in question are PET bottles, the intermediate conveyor 5 is implemented so as to convey the bottles in a suspended condition by seizing them at the neck. The intermediate conveyor may, however, also be e.g. a pocket chain or a screw or the like.

The intermediate conveyor 5 is configured such that it defines a second transfer site 13 with the first conveyor 2 as well as a second transfer site 14 with the second conveyor 3. The transfer sites 13 and 14 are preferably arranged at a short distance from one another. The intermediate conveyor 5 is switchable, i.e. it is adapted to be switched from a condition in which said second transfer sites 13, 14 are able to receive and transfer objects 6 to a condition in which the transfer sites 13, 14 are ineffective, i.e. they are unable to receive and/or transfer objects. This is preferably achieved in that object take-up means, i.e. grippers or the like, which are provided at the intermediate conveyor 5, are retracted from their operative position; this can be done e.g. by a controlled radial movement. Such retractable take-up means are, however, known from the prior art and need not be explained in detail here. Alternatively, it is also possible to move the intermediate conveyor 5 away from the first and second conveyors 2, 3.

The transfer sites 7, 9, 13 and 14 leading to the first and second conveyors 2, 3 are arranged such that, when seen in the conveying direction, the second transfer site 13 between the intermediate conveyor 5 and the first conveyor 2 is located ahead of the first transfer site 7 between the first conveyor 2 and the buffer 4, whereas the first transfer site 9 between the buffer 4 and the second conveyor 3 is located ahead of the second transfer site 14 between the second conveyor 3 and the intermediate conveyor 5, when seen in the conveying direction. It follows that that the objects 6 on the first conveyor 2 must pass the transfer site 13 to the intermediate conveyor 5 before they reach the buffer 4, and they first pass the first transfer site 9 to the second conveyor 3 before they pass the second transfer site 14 from the second conveyor 3 to the intermediate conveyor 5.

When the embodiment 1a of the conveying device 1 according to the present disclosure is in operation, objects are supplied to the second conveyor 2, said second conveyor 2 having e.g. supplied thereto bottles from a blow-molding machine used for producing PET bottles. The second conveyor 2 carries the objects 6 in the conveying direction F, illustrated by a rotation arrow, to the transfer site 13 leading to the intermediate conveyor 5. Normal operation is here assumed, i.e. the buffer is not needed. In this case, the objects 6 are transferred at the transfer site 13 to the enabled take-up means of the intermediate conveyor 5; as indicated by the blackened circles, the intermediate conveyor 5 conveys them in the conveying direction F (rotation arrow) to the transfer site 14 of the second conveyor 3 which is driven synchronously and with the same efficiency. At the second transfer site 14, the objects are transferred to the second conveyor 3, said second conveyor 3 being the indexing star wheel 8 in the embodiment shown, which, in turn, transfers the objects to the infeed star wheel 10 from where they are conveyed to the next machine, e.g. a bottle filler.

In this case, the objects 6 pass through the conveying device 1 according to the present disclosure in a direct transport mode, whereas the first transfer sites 7, 9 are not occupied by any objects that could be transferred to the buffer 4. It follows that the buffer 4 can be rendered inoperative by providing the transfer sites 7 and 9 with a suitable structural design. The blow-molding machine and the bottle filler operate synchronously and with the same efficiency.

If some kind of malfunction necessitating the use of the buffer 4 occurs, e.g. a standstill of the bottle filler, the intermediate conveyor 5 is switched, i.e. switched to a condition in which the second transfer sites 13, 14 are ineffective. In this condition, the objects 6 continue to travel on the first conveyor 2 up to the first transfer site 7 leading to the buffer 4, where they are transferred to said buffer 4, as indicated by the empty circles. This is continued until the buffer 4 is full or until the malfunction has been eliminated. If necessary, the objects 6 which remained on the intermediate conveyor 5 between the transfer sites 13 and 14 are discharged. The intermediate conveyor 5 can be rendered inoperative.

When the normal operation is taken up again, e.g. after the elimination of the malfunction of the bottle filler, the objects are first removed from the buffer 4. In the ineffective state of the transfer sites 13 and 14, this is done by restarting the operation of the second conveyor 3. However, also the first conveyor 2 can simultaneously resume its normal operation and resupply, at least partially, the objects removed by the second conveyor 3 from the buffer 4. Due to the fact that it directly communicates with the buffer 4, the second conveyor 3 can operate at a higher speed than the first conveyor 2 so that, in spite of the resupply, the buffer 4 will be gradually emptied. When the buffer 4 is empty, the intermediate conveyor 5 is—if necessary, after a speed reduction of the second conveyor 3—switched on, i.e. the second transfer sites 13 and 14 are activated, so that switching to the direct conveying mode, in which the buffer 4 is bypassed, and the synchronous mode (identical speeds) can be effected, and the buffer 4 can be rendered inoperative in this way.

Figure 2:
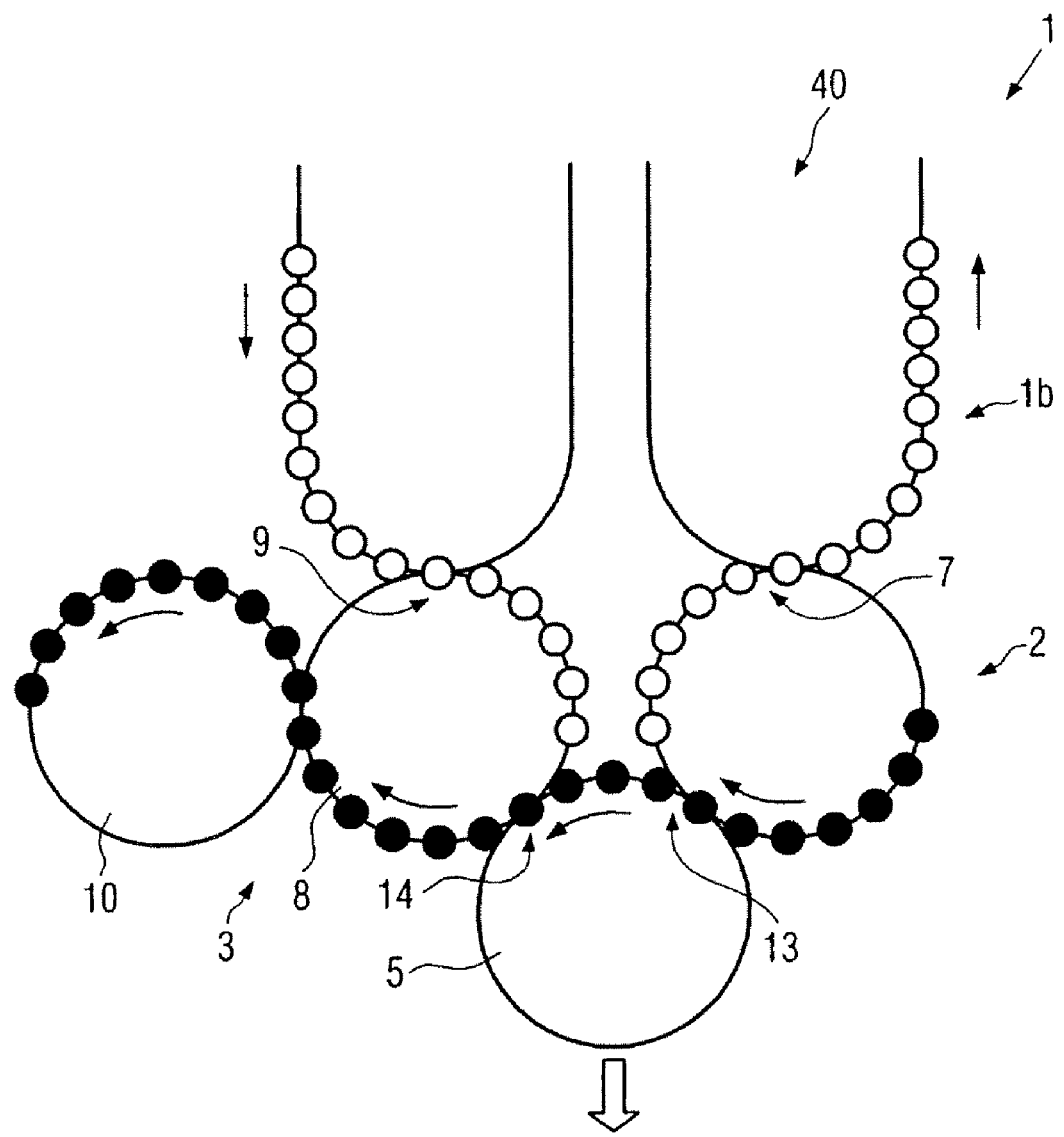
FIG. 2 shows a schematic representation of the function of a second embodiment of the present disclosure.

FIG. 2 shows a second embodiment 1b of the conveying device 1 according to the present disclosure, which differs from the embodiment according to FIG. 1 only insofar as the buffer 40 is different. Identical or comparable components are designated in FIG. 2 by the same reference numerals as in FIG. 1 and will not be explained once more with regard to their function and structural design.

The buffer 40 according to embodiment 1b is a so-called dynamic buffer, i.e. a buffer which is able to vary its buffer capacity according to requirements. Such buffers are described e.g. in WO 2005/073113 or in U.S. Pat. No. 6,152,291. The dynamic buffers described there are able to vary their buffer capacity by varying the effective conveying length for the objects. A great advantage of such dynamic buffers is to be seen in the fact that speed variations between the first and the second conveyor can be compensated much more easily. Such dynamic buffers comprise e.g. a carriage which, depending on the respective infeed or outfeed speed, reduces or enlarges the effective length between the transfer sites 7 and 9, depending on whether it is the first conveyor 2 or the second conveyor 3 that operates at a higher speed. Also in this case, the "first in-first out" principle is consistently sustained. In addition, the spacing (indexing) of the objects in the buffer can be maintained constant so that no screw conveyor 12 or the like will be necessary.

In a modified form of the above described and illustrated embodiments, the conveying device according to the present disclosure can also be used for other conveying tasks, in particular for handling bottles. It can be arranged e.g. between a bottle filler and a labelling machine. Also a labelling machine would be able to operate with an overcapacity corresponding e.g. to 110% of the capacity of a bottle filler, so that the buffer can be regenerated while the bottle filler is in operation.

The invention claimed is:

1. A conveying device for objects comprising:
 a first conveyor, a second conveyor and an intermediate buffer, the intermediate buffer is adapted to communicate with the first conveyor via a buffer transfer site, said buffer is adapted to communicate with the second conveyor via a buffer transfer site, the buffer transfer site between the buffer and the second conveyor being arranged separately from a buffer transfer site between the buffer and the first conveyor, and an intermediate conveyor, which bypasses the buffer, the intermediate conveyor being adapted to be brought in conveying connection with the first conveyor via a first bypass transfer site, the intermediate conveyor being adapted to be brought in conveying connection with the second conveyor via a second bypass transfer site,
 wherein the intermediate conveyor is switchable between an ineffective condition, wherein the buffer transfer sites of the first and second conveyors are, respectively, connected to the buffer, and an effective condition, wherein the bypass transfer sites of the first and second conveyors are, respectively, connected to one another via the intermediate bypass conveyor for bypassing the buffer.

2. A conveying device according to claim 1, wherein the second transfer site is arranged on the side of the first transfer site facing away from the buffer in the conveying direction.

3. A conveying device according to claim 1, wherein the buffer is a buffer having an accumulating capability.

4. A conveying device according to claim 1, wherein the intermediate conveyor is a star wheel.

5. A conveying device according to claim 1, wherein one of the first conveyor, second conveyor, or a combination of the first and second conveyor is a star wheel.

6. A conveying device according to claim, wherein the intermediate conveyor comprises object take-up means which can be switched ineffective at the second transfer sites.

7. A conveying device according to claim 6, wherein the take-up means can be retracted from an object take-up position.

8. A conveying device according to claim 1, and a device for varying the spacing of the conveyed objects.

9. A bottle handling apparatus comprising a blow-molding machine, a bottle filler, and an intermediate conveying device according to claim 1.

10. A conveying device according to claim 1, wherein the objects are bottles.

11. A conveying device according to claim 3, wherein the buffer is a dynamic buffer.

* * * * *